United States Patent
Shafaat et al.

(10) Patent No.: US 8,188,889 B2
(45) Date of Patent: May 29, 2012

(54) METHOD AND SYSTEM FOR DISPLAY OF TRAFFIC INFORMATION IN THE FLIGHT DECK

(75) Inventors: Syed Taji Shafaat, Everett, WA (US); Laureen A. Ervin, Carnation, WA (US)

(73) Assignee: The Boeing Company, Chicago, IL (US)

( * ) Notice: Subject to any disclaimer, the term of this patent is extended or adjusted under 35 U.S.C. 154(b) by 100 days.

(21) Appl. No.: 11/956,721

(22) Filed: Dec. 14, 2007

(65) Prior Publication Data

US 2009/0153343 A1  Jun. 18, 2009

(51) Int. Cl.
*G08G 5/04* (2006.01)

(52) U.S. Cl. .................... 340/961; 340/945; 340/980

(58) Field of Classification Search .......... 340/945, 340/961, 979, 980
See application file for complete search history.

(56) References Cited

U.S. PATENT DOCUMENTS

| | | | |
|---|---|---|---|
| 5,248,968 A | 9/1993 | Kelly et al. | |
| 6,118,385 A | 9/2000 | Leard et al. | |
| 6,160,497 A * | 12/2000 | Clark | 340/961 |
| 6,683,562 B2 * | 1/2004 | Stayton et al. | 342/182 |
| 7,015,829 B2 | 3/2006 | Godard et al. | |
| 7,212,918 B2 | 5/2007 | Werback | |
| 7,212,920 B1 * | 5/2007 | Bailey et al. | 701/211 |
| 7,307,578 B2 * | 12/2007 | Blaskovich et al. | 342/29 |
| 7,548,183 B2 | 6/2009 | King et al. | |
| 7,724,178 B2 | 5/2010 | Brandao et al. | |
| 7,739,042 B2 | 6/2010 | Stiller et al. | |
| 7,786,922 B2 | 8/2010 | Stayton et al. | |
| 7,826,971 B2 | 11/2010 | Fontaine et al. | |
| 2006/0227036 A1 * | 10/2006 | Blaskovich et al. | 342/29 |
| 2009/0157287 A1 | 6/2009 | Shafaat et al. | |

FOREIGN PATENT DOCUMENTS

| | | |
|---|---|---|
| FR | 2897976 A1 | 8/2007 |
| WO | 2006104776 A1 | 5/2006 |

OTHER PUBLICATIONS

European Search Report for Application No. EP08253910.7, dated Jul. 14, 2009, 7 pages.
U.S. Appl. No. 11/600,012, filed Nov. 14, 2006, Goodman et al.

* cited by examiner

*Primary Examiner* — Travis Hunnings
(74) *Attorney, Agent, or Firm* — The Boeing Company; Brook Assefa

(57) ABSTRACT

Context-Sensitive Reference (CSR) for situational awareness, and associated methods and systems are disclosed. A system in accordance with one embodiment includes an aircraft display system having a traffic application with traffic symbols representing traffic aircraft and a CSR associated with traffic aircraft displayed proximate to the respective traffic symbol. The CSR improves situational awareness of the traffic scenario by further refining the depiction of actual traffic on a traffic display relative to own-ship suitable to the traffic situational awareness need at hand. Such depiction may be in time or distance relative to own-ship or to fixed structure, and engaged in an automatic or manual mode.

20 Claims, 5 Drawing Sheets

METHOD AND SYSTEM FOR DISPLAY OF TRAFFIC INFORMATION IN THE FLIGHT DECK

TECHNICAL FIELD

Aspects of the present disclosure are directed to situational awareness of airborne and on-ground traffic and associated systems and methods.

BACKGROUND

Complex dynamical systems such as air traffic management and control are facing increasing demands from private, commercial, and military operations. Vehicles such as airplanes, ships, and other mobile platforms are able to meet stringent safety, efficiency, and performance requirements through the integration of complex on-board computer systems. Such complex on-board computer systems work not only with other on-board equipment but must communicate with complex systems of other mobile or fixed platforms' computer systems. While such complex systems can be designed to interact with each other in a variety of ways, they must in the end be subject to supervisory review and control by a human operator.

Complex systems utilized for air or ground traffic management often rely on human-machine interfaces to present information to pilots and operators. One important human-machine interface in traffic management is a display system that depicts information not only about the own-ship but also about the traffic environment including information on nearby traffic aircraft. The amount of information and the limited display space often creates a contention that poses a serious design challenge of providing meaningful context to human operators.

Moreover, as a primary human-machine interface, display systems generally have to be shared between multiple applications, often displaying the status information of multiple systems. For example, a map, weather, or terrain display may be used in conjunction with traffic display. Consequently, the traffic information used for a traffic application may not fit well with a map information used for a navigation application. Thus, human operators such as pilots have the difficult task of integrating the displayed information of multiple systems in a meaningful and efficient way to gain situational awareness of the traffic scenario.

SUMMARY

The disclosed systems and methods address these challenges in a meaningful way by displaying a Context-Sensitive Reference (CSR) suitable for the traffic situational awareness need at hand. The CSR improves the accuracy of the displayed traffic scenario by further refining the depiction of traffic vehicles on a traffic display relative to own-ship. Such depiction may be used for applications that require more precise spacing, such as spacing behind a lead airplane. The spacing may be terms of time or distance relative to own-ship or to fixed structure.

An aspect of a system for displaying vehicle traffic comprises a dynamic symbology displayed on a graphical display. The dynamic symbology comprises at least one vehicle symbol depicting traffic information, and a CSR indicator proximate to the vehicle symbol. The location of the indictor is based on own-ship's sensitivity to a relative position of the vehicle traffic depicted by at least one vehicle symbol.

In accordance with another aspect of this invention, the CSR is displayed proximate to the traffic symbol of interest, further depicting the absolute or relative location of the actual traffic relative to own-ship.

In accordance with another aspect of this invention, the CSR is displayed with symbology suitable to the traffic situational awareness application at hand such as maintaining spacing standards with other traffic.

In accordance with yet further aspects of this invention, the CSR is displayed with symbology suitable for traffic situational awareness applications such maintaining clearance with respect to airport surface traffic or fixed structure configurations.

DETAILED DESCRIPTION

Complex dynamical systems such as air traffic management and control are facing increasing demands from private, commercial and military operations. Vehicles such as airplanes, ships, and other mobile platforms have addressed such demands that include stringent safety, efficiency, and performance requirements through the integration of complex on-board systems. For example, navigation and surveillance on-board aircraft equipment has evolved from simple equipment such as compasses, automatic direction finders, and Mode A/C transponders to more advanced equipment using capabilities such as Global Positioning Systems (GPS) and Automatic Dependent Surveillance-Broadcast (ADS-B).

Moreover, such complex on-board systems not only work with other on-board equipment but also communicate with complex systems of other mobile or fixed-platform computer systems. For example, GPS-based on-board navigation equipment is enabled by GPS satellites, and potentially, also by ground-based augmentation systems. ADS-B based surveillance equipment is also enabled by a number of systems including GPS, inertial navigation systems (INS), surveillance systems such as Mode Select (Mode S), Universal Access Transceiver (UAT), and VHF Datalink Mode 4 (VDL-4), and potentially, communications systems such as VHF Datalink, HF Datalink, or other datalink systems.

Figure 1:
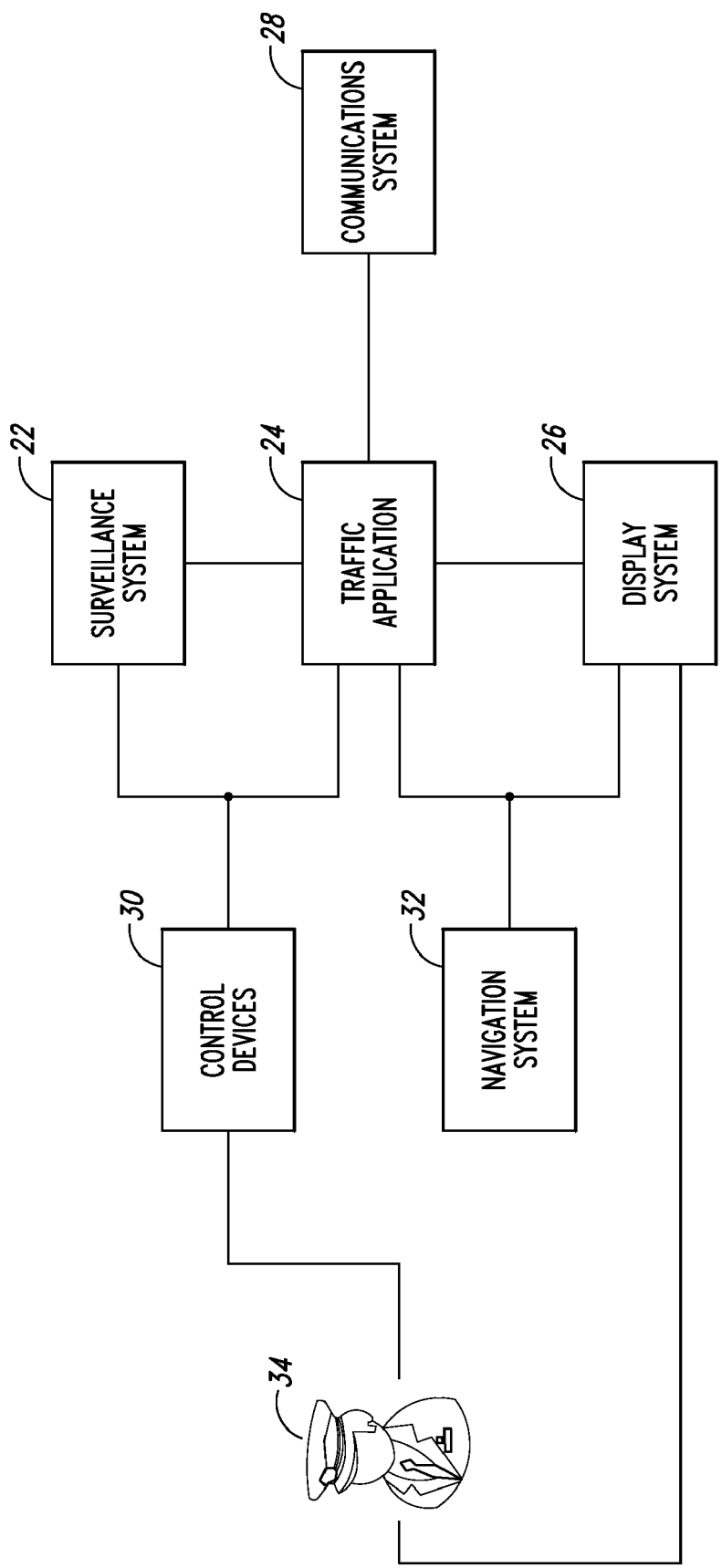
FIG. 1 is schematic diagram of an advantageous embodiment of the systems components according to the invention.
Figure 5:
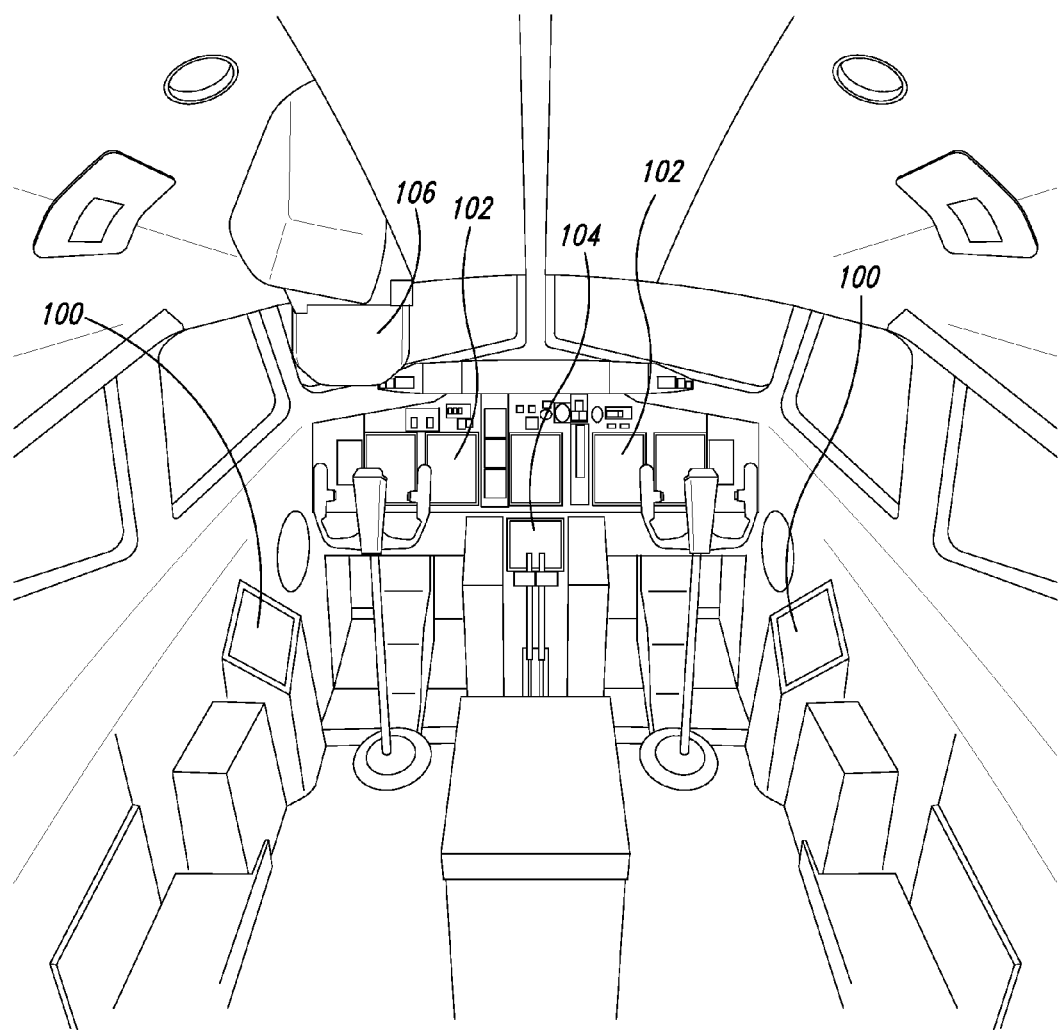
FIG. 5 represents several possible display locations for an advantageous embodiment of the invention.

FIG. 1 depicts an embodiment of such complex on-board systems from the vantage point of an aircraft on-board surveillance system. FIG. 1 has been simplified in order to make it easier to understand the present invention. Those skilled in the art will appreciate that FIG. 1 is one configuration of many that can be implemented for an embodiment of an on-board surveillance system. For example, a traffic application 24 can be hosted on a number of on-board computers suitable for the airplane configuration at hand such as a dedicated traffic application computer (not shown), a surveillance system 22, or a display system 26, which typically comprises of at least a graphics display computer and a graphics display. In various embodiments, as shown in FIG. 5, the display system may include at least one of a Navigation Display (ND) 102, a Heads-Up Display (HUD) 106, an Electronic Flight Bag (EFB) display 100, a Multi-Function Display (MFD) 104, or other displays in the flight deck.

Referring to FIG. 1, a surveillance system 22 is provided to receive traffic information of other aircraft and vehicles and to transmit traffic information of own aircraft. Such traffic information may include data such as aircraft identification, aircraft position, speed, and planned trajectory that may be displayed as a function of the traffic application 24 engaged by the crew. An aircraft may have multiple traffic applications such as Traffic Alert and Collision Avoidance System (TCAS), Sequencing and Merging (S&M), and Final Approach and Runway Occupancy Awareness (FAROA). Further, control devices 30 such as control panels, keyboards, cursor control devices, line select keys (LSK) or other keys on a control display unit (CDU), or touch-screen devices may also be provided to control and configure the traffic application 24 that processes the traffic data received from the surveillance system 22. Control devices 30 may also be used to select traffic on the display system 26 for further processing or action.

In addition, the traffic application 24 obtains own-ship navigation information from the aircraft's navigation system 32 or related systems such as the flight management computer. Navigation information may include data such as own-ship position, altitude, speed, or planned trajectory. Navigation information may be used by the traffic application for a number of functions including further processing of traffic information coming from other aircraft, transmitting own-ship information to other aircraft, or presenting information to a human operator 34 on a display system 26 for situational awareness or crew action.

Lastly, the traffic application 24 may be operable to obtain communication information from the aircraft's datalink-based communications system 28 such as VHF Datalink, HF Datalink, Mode S Datalink, or other datalink systems such as those enabled by Wi-Fi or WiMAX. Datalink communications may include communication data from other traffic aircraft that augment the traffic information that is received by the surveillance system 22. For example, the datalink communication may include pilot requests for certain crew communication such as confirmation of aircraft identification and request for information such trajectory planning information or weather information that may be more suitable for transmission through the communications system 28 than the surveillance system 22. The traffic application will correlate the traffic information coming from the surveillance system 22 and the communication information coming from the communications system 28 and present the correlated information in a suitable format on the display system 26. Such correlation may also be aided by the crew via control devices 30 or via other components of the communication system 28.

While the components of complex systems such as those depicted in FIG. 1 can be designed to interact with each other in a variety of ways, they must in the end be subject to supervisory control by a human operator 34 such as a pilot. Moreover, such systems often must enable the human operator 34 to gain situational awareness in order to consider potential actions. Thus, complex systems utilized for air or ground traffic management often rely on several human-machine interfaces to present information to human operators 34 such as pilots.

One important human-machine interface in traffic management is a display system 26 that depicts information not only about the own-ship but also about the traffic environment including information on nearby traffic aircraft. But because the display system 26 may also display information coming from a variety of systems such as the navigation system 32 and the communication system 28, the amount of information relative to the limited display space often creates a contention that poses a serious challenge of providing meaningful context to human operators.

Figure 2:
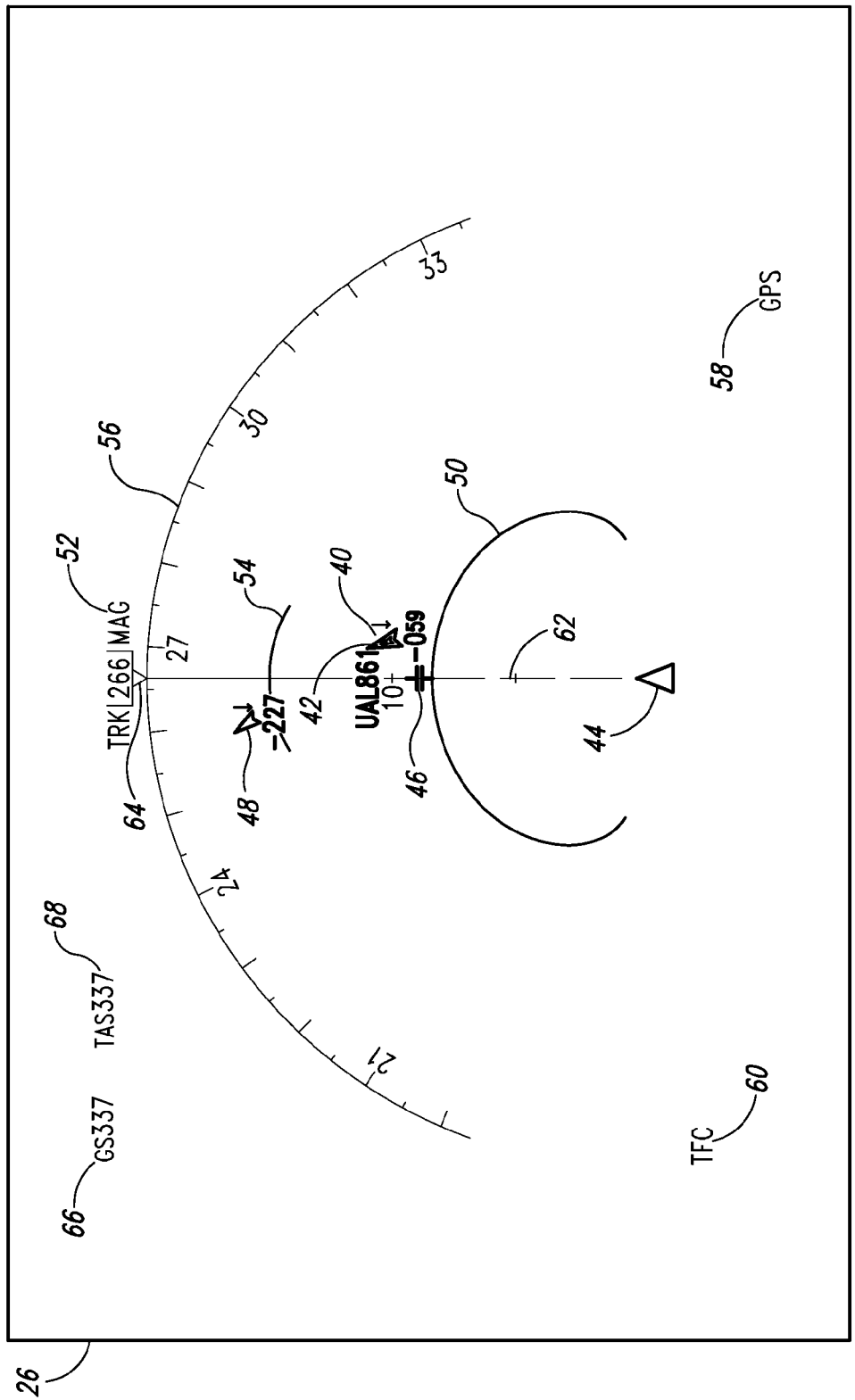
FIG. 2 is a diagram illustrating a graphics display used for navigation and surveillance.

FIG. 2 depicts one mode of a display system 26 used for navigation and surveillance purposes. Those skilled in the art will appreciate that FIG. 2 depicts one configuration of many that can be implemented for an embodiment of a shared display system. The display system indicates that the navigation source is GPS 58. The traffic indicator, TFC 60, also shows a traffic application is selected to be displayed.

Referring to FIG. 2, one can see that current mode of the display system is primarily navigational. Although not shown, the display system can be selected to display weather systems, terrain, or other configurations. In the current map mode, the display system 26 shows an expanded compass rose 56, a range scale 62, a spacing ring 50, an altitude range arc 54, a current heading pointer 64, own-ship symbol 44, traffic symbols 40, 48 along with their associated data tags, a pointer 46, ground speed 66, true airspeed 68, and magnetic reference 52. For example, the current mode shows a display range selection of 20 nautical miles as indicated by the range scale 62.

However, in modern aircraft the display range can vary from a very low to very large distances such as from 0.25 nautical miles to as large as more than 1000 nautical miles. Thus, when the display system 26 is shared with a surveillance application, the presentation of the traffic aircraft on a display system selected for a 20 nautical mile range and one selected for a 1200 nautical mile range display traffic symbols 40, 48 is substantially of the same size. That is, the size of the traffic symbol does not shrink or expand as a function of the displayed range.

Consequently, for certain traffic applications that require better display accuracy of the traffic aircraft than can be afforded by the selected display range for navigation purposes or by other limitations of the display system, human operators 34 such as pilots are faced with a difficult task of ascertaining the location of traffic aircraft to the desired accuracy. Thus, there is a need to aid human operators 34 who have the difficult task of integrating the displayed information of multiple systems in a meaningful and efficient way to gain better situational awareness of the traffic scenario.

The present invention addresses this challenge in a meaningful way by displaying a Context-Sensitive Reference (CSR) 42 suitable to the traffic situational awareness need at hand. Preferably, the CSR 42 is displayed as a symbol smaller than the traffic symbol. More preferably, the CSR 42 has a shape different from the traffic symbol, and most preferably, the CSR 42 is a small circle or a dot. The CSR 42, displayed proximate to the traffic symbol 40, further refines the location of the depicted traffic relative to the traffic symbol 40, as well as, relative to own-ship. In this regard, proximate means on or near the traffic symbol 40. Depending on the accuracy of the traffic information source or the traffic application in use, the CSR 42 may be displayed on top of the traffic symbol 40 or next to the traffic symbol 40. Such depiction may be used for applications that require more precise spacing with respect to a traffic vehicle of interest, such as spacing behind a lead airplane. The spacing may be terms of time or distance relative to own-ship or to fixed structure.

The CSR 42 can be utilized in several different traffic application implementations. In one aspect of the invention related to improved situational awareness, the CSR 42 can be displayed on one, several, or all displayed traffic symbols 40 further depicting the location of the displayed traffic aircraft. Alternatively, the CSR 42 may be displayed only on nearby aircraft or a limited number of aircraft selected by the control devices 30. For example, a pilot may utilize a control device 30 to select one nearby aircraft of interest to display the CSR 42 for that aircraft.

In another aspect of the invention, the CSR 42 may be displayed as a function of a specific traffic application such as ones designed for maintaining certain spacing from other aircraft. In this case, the CSR 42 may be displayed in the context intended by the traffic application. For example, referring to FIG. 3, if the human operator 34 is utilizing a traffic application to maintain a certain longitudinal distance behind the traffic aircraft of interest, the CSR 74 is displayed proximate to the tail end of a traffic symbol 72. In a similar manner, if the objective is to maintain a certain lateral distance next to the traffic aircraft of interest, the CSR is displayed proximate to the side of the traffic symbol 72.

Figure 3:
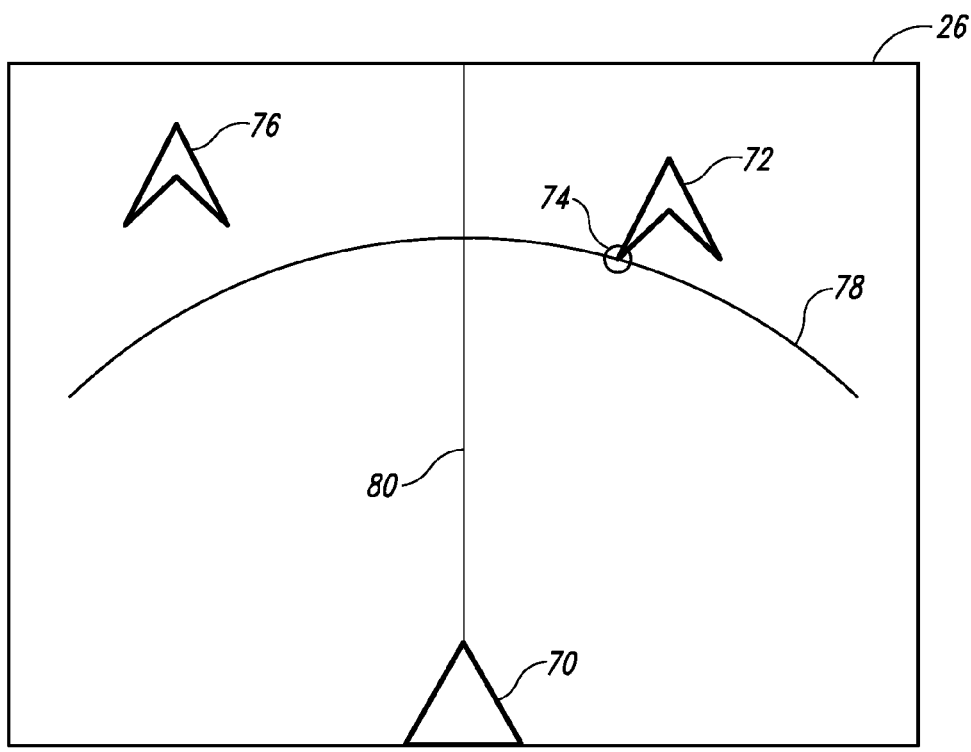
FIG. 3 is an enlarged view of FIG. 2 further depicting airborne traffic with CSR symbology.

Referring to FIG. 3, the maintenance of certain spacing from a traffic aircraft 72, 76 from own-ship 70 may also be aided by a spacing ring 78 that depicts a spacing in time or distance from the traffic aircraft 72. If a human operator desires to maintain a certain time spacing such as 90 seconds from the traffic aircraft 72 that is ahead, along a track line 80, the human operator 34, with or without the aid of an autopilot system, can ensure the spacing by flying the airplane such that the CSR 74 of the traffic symbol 72 is on or outside the spacing ring 78. In a similar manner, the spacing ring 78 can be displayed to show a separation in distance so as to ensure the desired separation distance is maintained. Thus, the CSR 74 can aid the human operator 34 in acquiring improved situational awareness beyond what is provided by the traffic symbol 72 and regardless of the range setting of the map display.

In yet another aspect of the invention, the CSR can be displayed in the context of both the traffic aircraft and fixed structural configurations such as airport runways, taxi-ways or other structure. For example, flight crew may want to know if an airplane has cleared a runway or a taxiway. Better situational awareness in this regard will help the flight crew perform their tasks in a safe and efficient manner.

Figure 4:
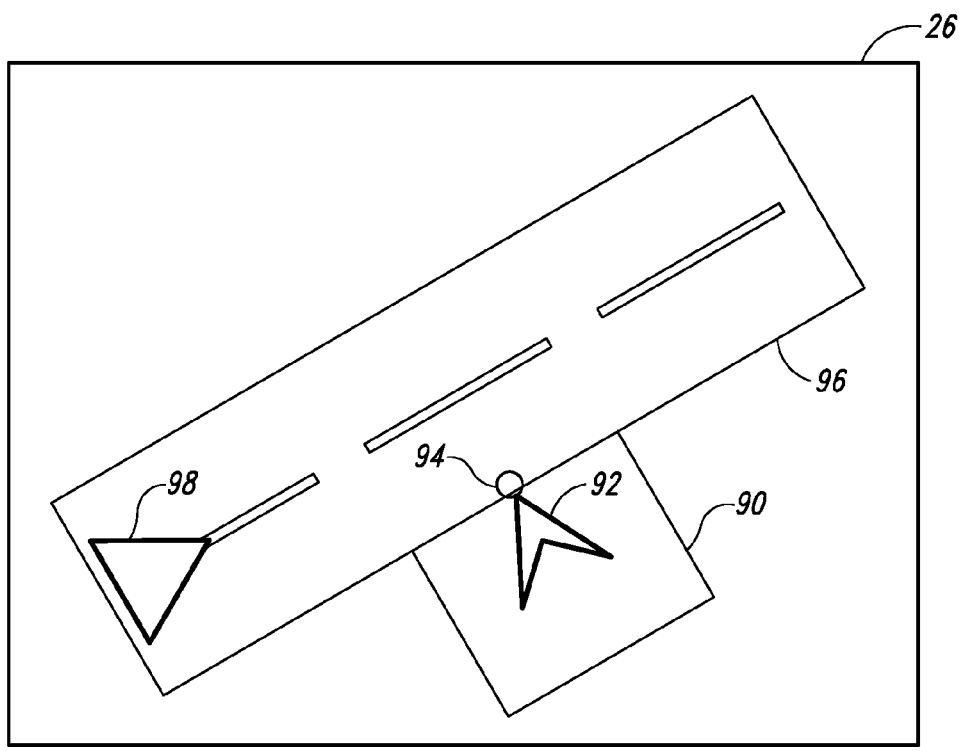
FIG. 4 is a diagram illustrating ground traffic with CSR symbology.

Referring to FIG. 4, the human operator 34 of own-ship 98 may want to know if any part of a traffic aircraft has entered a runway 96 from a taxiway 90. A CSR 94 of the traffic aircraft depicted by a traffic symbol 92 will provide the human operator 34 better situational awareness as to the exact position or location of the traffic aircraft. In this case, the CSR 94 may be displayed not only as a function of the traffic airplane's actual position, but also as a function of the geometric structure of the airport configuration and clearance requirements of own-ship aircraft. For example, in FIG. 4, the pilot of the own-ship 98 will see on the display system that the runway 96 is not clear.

Thus, another important aspect of the invention is the ability to apply the invention in a context-sensitive manner. With displays that function as shared navigation and surveillance displays, which in addition, have display ranges that vary from 0.25 nautical miles to more than 1000 nautical miles, a constant size of a traffic symbol of, for example 0.25 inch, may cover several nautical miles on the display. However, the pilot may need to know where the traffic aircraft is to within a few miles or to within a few seconds. The CSR introduces a graphical way of depicting a sensitivity of interest to the human operator independent of the size of the traffic symbol or the display range. The sensitivity, which can be in terms of time, distance, or other parameter of interest, can depend on factors such as phase of flight or any critical task for which the flight crew needs improved situational awareness. Accordingly, the sensitivity may be set manually by a control device 30 or by systems automation.

Figure 6:
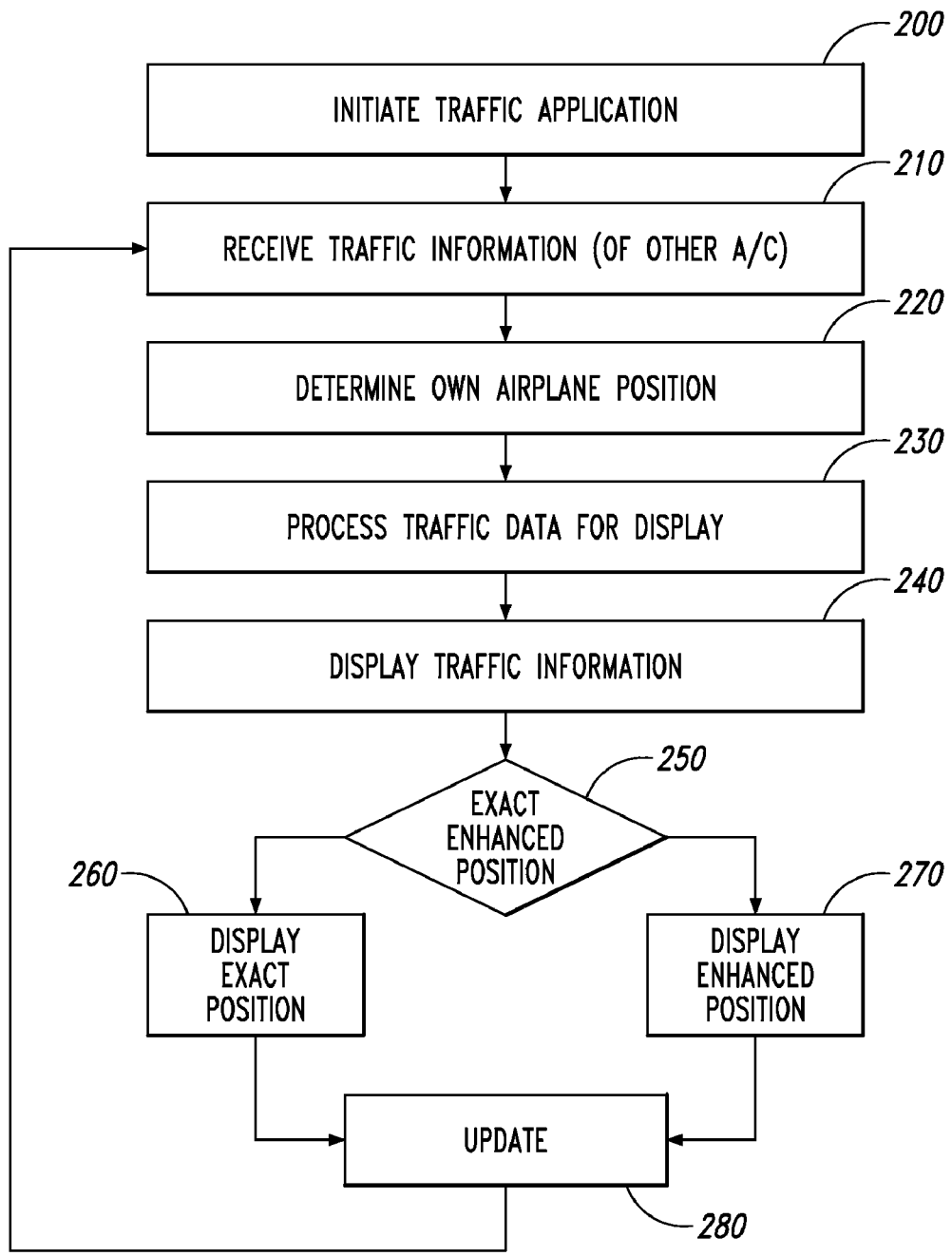
FIG. 6 is a flow chart illustrating an exemplary method for displaying CSR symbology.

FIG. 6 depicts a general method by which the invention may be implemented. Traffic symbology and their placement on associated display systems such as those of Traffic Alert and Collision Avoidance System (TCAS) have been previously implemented in industry. Those skilled in the art would understand how the placement of the traffic symbology would be accomplished, and that the depiction herein is one of several ways of showing a general method of displaying traffic symbology.

First, the human operator 34 or an on-board computer initiates a traffic application 200 of interest. This initiation step may range from simply turning on the system, choosing different traffic applications, or in the case of initiating different modes of a previously selected application, selecting traffic symbols via a control device 30, or providing the application additional information from another system such as the navigation system 32 or the communication system 28.

Next, the traffic application receives traffic information 210 of other aircraft via the surveillance system 22. Furthermore, the traffic application 24 receives or retrieves updates of navigation data from the navigation system to determine own-ship position 220. After receiving the traffic information of other aircraft and position updates of own-ship, the traffic application 24 processes the traffic data for display 230 and displays 240 the traffic symbols 40, 48.

Following the display of the traffic symbols 40, 48, the traffic application displays a CSR 42, 74, 94 depicting exact or enhanced position 250. Display of exact position 260 depicts raw position data received from traffic aircraft, proximate to the traffic symbol 40, 72, 92. Alternatively, depending on factors such as the selected traffic application, the phase of flight, or other engaged automation functions, the CSR 42, 74, 94 may be displayed to depict a context-sensitive enhanced position. That is, display of enhanced position 270, depicts the received position data adjusted for context-sensitive factors that address the situational awareness need of the flight crew. Such context-sensitive factors may include airport runway or taxiway clearance of traffic aircraft and maintenance of spacing standards between own-ship and other aircraft. Lastly, the display is updated 280 either in an automatic mode or a manual mode.

The invention can also be used for test purposes to verify the traffic data that is received from multiple systems of traffic aircraft. As described earlier, the transmitting system of traffic aircraft may engage various datalink transmission modes such as VDL-4, Mode S, or UAT. Additional modes may also be engaged using Wi-Fi or WiMAX datalinks. Thus, there may be an interest in checking how close values of the transmitted data of the different systems are relative to each other. In this case, the invention may be embodied to display multiple CSRs 42, 74, 94 associated with each traffic symbol 40, 72, 92 with different shapes or colors signifying the source of the traffic data.

Furthermore, there may also be an interest to calibrate the receiving system against a known, stationary traffic source such as the own-ship's transmitter or a test-set transmitting in various modes such as described above. Accordingly, the invention may be embodied to display multiple CSRs associated with the traffic symbol of the stationary source such as the own-ship symbol 44, 70, 98.

Lastly, air and ground traffic applications may be simulated using a flight simulator or a desktop computer in combination with CSR embodiments of the invention. Such simulation can be used to test or develop the system, as well as, train human operators in educational settings.

While preferred embodiments have been described above and depicted in the drawings, other depictions of traffic symbols and CSRs can be utilized in various embodiments of the invention. The color, geometric shape, and size of the traffic symbol and the CSR can be varied without departing from the spirit and scope of the invention as defined by the appended claims. Furthermore, various displays, surveillance systems, navigation systems, and communication systems may be engaged to provide the necessary input for the traffic application in use.

In summary, the invention addresses the challenge of providing context-sensitive situational awareness by displaying a Context-Sensitive Reference (CSR) suitable to the traffic situational awareness need at hand. The CSR improves the accuracy of the displayed traffic scenario by further refining the depiction of actual traffic on a traffic display relative to own-ship. Such depiction may be used for applications that require more precise spacing behind a lead airplane. The spacing may be terms of time or distance relative to own-ship or to fixed structure, and engaged in an automatic or manual mode.

We claim:

1. A system for displaying vehicle traffic for a traffic application comprising:
   a dynamic symbology displayed on a map display of an own-ship cockpit display system, said dynamic symbology comprising at least one vehicle symbol depicting vehicle traffic and a Context-Sensitive Reference (CSR) indicator proximate to said at least one vehicle symbol, wherein said CSR includes a color-coded circular indicator smaller than the vehicle symbol, further wherein said CSR indicator indicates the spacing between said vehicle traffic and own-ship independent of the range setting of the map display.

2. An aircraft system for managing spacing between vehicle traffic and own-ship comprising:
   an airplane surveillance system;
   a traffic application operatively connected to said surveillance system;
   a cockpit display system operatively connected to said traffic application;
   a navigation system operatively connected to said traffic application;
   a control input device operatively connected to said surveillance system and said traffic application; and
   a dynamic symbology displayed on a map display of said cockpit display system wherein said dynamic symbology includes a at least one vehicle symbol depicting vehicle traffic and a Context-Sensitive Reference (CSR) indicator proximate to said at least one vehicle symbol, wherein said CSR includes a color-coded circular indicator smaller than the vehicle symbol, further wherein said CSR indicator indicates the spacing between said vehicle traffic and own-ship independent of the range setting of the map display.

3. The system of claim 2 wherein the traffic information includes airborne vehicle traffic data.

4. The system of claim 2 wherein the traffic information includes on-ground vehicle traffic data.

5. The system of claim 2 wherein the traffic information includes both airborne vehicle and on-ground vehicle traffic data.

6. The system of claim 2 wherein the cockpit display system is at least one of a Navigation Display (ND), a Heads-Up Display (HUD), an Electronic Flight Bag (EFB) display, and a Multi-Function Display (MFD).

7. The system of claim 2 wherein the control device is at least one of a control panel, a keyboard, a cursor with a cursor control device, line select keys (LSK) on a control display unit, and a touchscreen.

8. The system of claim 2 wherein said navigation system comprises a GPS unit.

9. The system of claim 1 further comprising an electronic map display.

10. A method for managing spacing between vehicle traffic and own-ship on a map display of a cockpit display system independent of the range setting of the map display, comprising:
    initiating a traffic application;
    providing control input for said traffic application;
    receiving vehicle traffic information;
    determining own-ship's position;
    processing said vehicle traffic information combined with own-ship location information;
    generating exact vehicle traffic position or enhanced vehicle traffic position based on said control input; and
    displaying said exact vehicle traffic position or said vehicle enhanced traffic position based on said control input, said exact vehicle traffic position or enhanced vehicle traffic position displayed using a dynamic symbology on a map display of said cockpit graphical display system, wherein said dynamic symbology comprises at least one vehicle symbol depicting said vehicle traffic and a Context-Sensitive Reference (CSR) indicator proximate to said at least one vehicle symbol, wherein said CSR includes a color-coded circular indicator smaller than the vehicle symbol, further wherein the location of said CSR indicator is based on said own-ship's spacing sensitivity relative to said vehicle traffic depicted by said at least one vehicle symbol.

11. The method of claim 10 wherein receiving traffic information comprises receiving at least one of TCAS, Mode A/C, Mode S, ADS-B, UAT, VDL, Wi-Fi, or WiMAX data.

12. The method of claim 10 wherein traffic information from other vehicles is received using a surveillance system.

13. The method of claim 10 wherein the processing of the traffic information is by a surveillance system containing a traffic application software program operatively connected to a cockpit display system.

14. The method of claim 10 wherein the processing of the traffic information is by a display system containing a traffic application software program operatively connected to a surveillance system.

15. The method of claim 10 wherein the processing step further comprises transforming the received traffic information for display for a plurality of traffic applications.

16. The method of claim 10 further comprising of displaying dynamic symbology selectable by a control device.

17. The method of claim 10 wherein said traffic application is simulated on a flight simulator.

18. The method of claim 10 wherein said traffic application is simulated on a desktop.

19. The method of claim 10 further comprising of a testing step wherein multiple indicators associated with a traffic symbol are displayed.

20. A method of indicating a relative position of vehicle traffic on a display, the relative position used for managing spacing between vehicle traffic and own-ship, the method comprising:

displaying a map having a distance scale on a graphical display, the map capable of representing a plurality of distance scales;

displaying a location of at least one vehicle traffic by a vehicle symbol on the map, the vehicle symbol having a fixed size regardless of the distance scale of the map displayed;

displaying an own-ship vehicle symbol;

determining own-ship's position; and displaying a Context-Sensitive Reference (CSR) indicator proximate to the vehicle symbol, wherein said CSR includes a color-coded circular indicator smaller than the vehicle symbol, further wherein the placement of the CSR indicator more precisely represents the spacing between said own-ship and said vehicle traffic depicted by said vehicle symbol independent of the distance scale setting of the map display.

* * * * *